(12) United States Patent
Sakuda

(10) Patent No.: US 7,936,475 B2
(45) Date of Patent: May 3, 2011

(54) IMAGE DISPLAY SYSTEM

(75) Inventor: Kenji Sakuda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 933 days.

(21) Appl. No.: 11/890,729

(22) Filed: Aug. 7, 2007

(65) Prior Publication Data

US 2008/0068675 A1 Mar. 20, 2008

(30) Foreign Application Priority Data

Aug. 7, 2006 (JP) .................................. 2006-214735

(51) Int. Cl.
G06F 3/12 (2006.01)

(52) U.S. Cl. ....... 358/1.15; 358/400; 358/407; 358/403; 348/731

(58) Field of Classification Search .................. 358/474, 358/1.15, 501, 442, 400, 407; 348/731, E5.097
See application file for complete search history.

(56) References Cited

U.S. PATENT DOCUMENTS

| | | | | |
|---|---|---|---|---|
| 5,115,374 A | * | 5/1992 | Hongoh | 361/679.09 |
| 5,555,105 A | * | 9/1996 | Shahir et al. | 358/473 |
| 6,567,190 B1 | * | 5/2003 | Reele | 358/474 |
| 7,092,113 B1 | * | 8/2006 | Saito et al. | 358/1.15 |
| 2002/0066108 A1 | * | 5/2002 | Aonuma | 725/94 |
| 2005/0270574 A1 | * | 12/2005 | Saito et al. | 358/1.15 |
| 2006/0250666 A1 | * | 11/2006 | Wexler et al. | 358/487 |
| 2007/0026371 A1 | * | 2/2007 | Wood | 434/317 |
| 2008/0137126 A1 | * | 6/2008 | Yoshida | 358/1.14 |
| 2009/0219580 A1 | * | 9/2009 | Cornell et al. | 358/474 |

FOREIGN PATENT DOCUMENTS

| | | |
|---|---|---|
| JP | 09-284448 | 10/1997 |
| JP | 2000-022879 | 1/2000 |
| JP | 2000-151881 | 5/2000 |
| JP | 2001-16462 | 1/2001 |
| JP | 2001-290724 | 10/2001 |
| JP | 2006-065549 | 3/2006 |

* cited by examiner

*Primary Examiner* — Negussie Worku
(74) *Attorney, Agent, or Firm* — Nutter McClennen & Fish LLP; John J. Penny, Jr.; Christina M. Sperry

(57) ABSTRACT

An image display system for reading and displaying an image includes an image display device and a scanner device that is connected to the image display device through a network. The image display device, when receiving instructions to read and display an image mounted on the scanner device from a user, specifies a predetermined reserved file name and transmits a file reading request to the scanner device. The scanner device, when receiving the file reading request, reads the image and transmits image data acquired by reading to the image display device using the reserved file name and makes the image display device display the image data.

2 Claims, 6 Drawing Sheets

IMAGE DISPLAY SYSTEM

The entire disclosure of Japanese Patent Application No. 2006-214735, filed Aug. 7, 2006 is expressly incorporated by reference herein.

TECHNICAL FIELD

The present invention relates to a technology by which an image, which is read by a scanner device and transmitted through a network, is displayed by an image display device.

BACKGROUND ART

A plug and play, as is generally known, is a technology that allows a peripheral device to be connected to a computer or to be disconnected from the computer at arbitrary timing after the start up of the computer. In recent years, a universal plug and play (hereinafter, referred to as "UPnP", trademark of UPnP Implementers Corporation) has been developed to apply plug and play technology to a network. With the UPnP, a network device may be connected to a network or disconnected from the network at an arbitrary timing. In the present description, an architecture that realizes a plug and play in a network like UPnP is termed as "network plug and play".

Japanese Patent Application Publication No. 2001-290724.

In the UPnP, it has not been specified up to an application layer. Then, the guidelines for mutually using digital contents, such as a dynamic image, a voice, or a static image among devices that are made by different makers have been stipulated in DLNA (Digital Living Network Alliance) and announced as "DLNA guidelines V1.0". In this DLNA guidelines V1.0, UPnP, HTTP (Hyper Text Transfer Protocol), or the like, are stipulated as a protocol for connecting devices and transmitting/receiving contents.

SUMMARY OF THE INVENTION

In a system in conformity with the above DLNA guidelines V1.0 (hereinafter, referred to as "DLNA system"), digital contents may be transmitted or received between a digital media server (DMS), which is a device that provides digital contents, and a digital media player (DMP), which is a device that reproduces digital contents. For example, in the DLNA system in which a computer provided with a mass storage hard disk is a DMS and a digital television receiver (hereinafter, also referred to as "DTV") is a DMP, the computer transmits a list of static images (a list of file names, or the like) stored in the hard disk to the DTV and the static image selected from this list may be displayed by transmitting it to the DTV.

However, it has been difficult to display an image that is read by a scanner device assembled into the DLNA system by directly acquiring the image with an image display device, such as the DTV. This is due to the following reasons. That is, in the DLNA system, a device that is able to store an image (storage device), such as a computer, a hard disk recorder, or a DVD recorder, is assumed as the DMS. Thus, the scanner device is not assumed as the DMS, so that a method of acquiring a list of images and/or a read image from the scanner device is not established. Therefore, in order for the image display device to display the image read by the scanner device, the image is once saved in a computer that is connected locally to the scanner device and the image is then transmitted from the computer to the image display device through a network for display. Thus, there has been a problem that a computer that is connected to a network needs to be prepared in addition to the scanner device. In addition, a user is required to save, transmit, and display the image, respectively and, hence, there has been a problem that it is considerably troublesome.

Incidentally, the above problem is not limited to the DLNA system, but it has been a common problem when an image that is read by the scanner device is transmitted to the image display device through a network and displayed by the image display device.

It is an object of the invention to provide a technology that is able to directly transmit an image, which is read by a scanner device, to an image display device through a network and to display the image.

In order to achieve the above object, an image display system according to the invention is an image display system for reading and displaying an image. The image display system includes an image display device and a scanner device that is connected to the image display device through a network. The image display device, when receiving instructions to read and display an image mounted on the scanner device from a user, specifies a predetermined reserved file name and transmits a file reading request to the scanner device. The scanner device, when receiving the file reading request, reads the image and transmits image data acquired by reading to the image display device using the reserved file name and makes the image display device display the image data.

In this manner, in the image display system according to the invention, when the image display device specifies a reserved file name and transmits a file reading request to the scanner device, the scanner device reads an image and transmits image data to the image display device using a reserved file name and makes the image display device display the image data, the image read by the scanner device may be directly transmitted to the image display device through a network and displayed.

In the above image display system, the image display device may function as a control point in a network plug and play, and the scanner device may be configured to notify the image display device in advance that the scanner device functions as a storage device in the network plug and play and also to notify the image display device in advance of the reserved file name.

With such a configuration, the image display device that functions as the control point is able to instruct the scanner device to read an image (and transmit image data) with the storage device utilizing a general data transmission and receiving method, that is, transmitting a file reading request with a file name specified.

In the above image display system, the scanner device may include a setting file storage unit, wherein the image display device, before transmitting the file reading request to the scanner device, may transmit a scan setting file that describes a scan condition and a writing request of the scan setting file to the scanner device, wherein the scanner device may write the scan setting file in the setting file storage unit, and wherein the scanner device, when reading the image, may read the image under the scan condition that is described in the scan setting file.

With such a configuration, the scan condition may be set to the scanner device utilizing a file transmission and writing method between the storage device and the control point.

In the above image display device, the scanner device may notify the image display device of a predetermined file size as a file size of the image data in advance, wherein the scanner device, when the file size of the image data is smaller than the predetermined file size, may add dummy data to the image data so as to become the predetermined file size and then transmit the image data, to which the dummy data are added, to the image display device.

With such a configuration, by notifying the image display device of a sufficiently large file size as a predetermined file size in advance, it is possible to prevent that received data cannot be normally processed in the image display device due to the scanned image data that exceed the file size that is notified in advance. In addition, because the dummy data are added to obtain the predetermined file size, it is possible to prevent that received data cannot be normally processed in the image display device due to the scanned image data, of which the size is smaller than the file size that is notified in advance.

A scanner device according to the invention is a scanner device that is connected to an image display device through a network. The scanner device, when receiving a file reading request from the image display device with a predetermined reserved file name specified, reads an image mounted on the scanner device and transmits image data acquired by reading using the reserved file name and makes the image display device display the image data.

In this manner, in the scanner device according to the invention, when the file reading request is received from the image display device with the reserved file name specified, reads an image, transmits image data to the image display device using the reserved file name and makes the image display device display the image data, the image read by the scanner device may be directly transmitted to the image display device through a network and displayed.

An image display device according to the invention is an image display device that is connected to a scanner device through a network. The image display device, when receiving instructions to read and display an image mounted on the scanner device from a user, specifies a predetermined reserved file name and transmits a file reading request to the scanner device and thereby instructs the scanner device to read the image.

In this manner, the image display device according to the invention, when receiving instructions to read and display an image mounted on the scanner device from a user, specifies a reserved file name and transmits a file reading request to the scanner device and thereby instructs the scanner device to read the image. Thus, when the scanner device is configured, when receiving the file reading request with the reserved file name specified, to read an image and transmit image data to the image display device, the image read by the scanner device may be directly transmitted to the image display device through the network and displayed.

Note that the invention may be modified into various forms. For example, forms, such as an image display method, an image display system, a scanner device, a computer program that implements the function of the image display device, a recording medium that contains the computer program, a data signal that is embodied in a carrier wave containing the computer program, or the like, may be realized.

BEST MODE FOR CARRYING OUT THE INVENTION

Hereinafter, a best mode for carrying out the invention will be described with reference to embodiments in the following order.

A. First Embodiment:
B. Second Embodiment:
C. Third Embodiment:
D. Alternative Embodiments:

A. First Embodiment

A1. System Configuration

Figure 1:
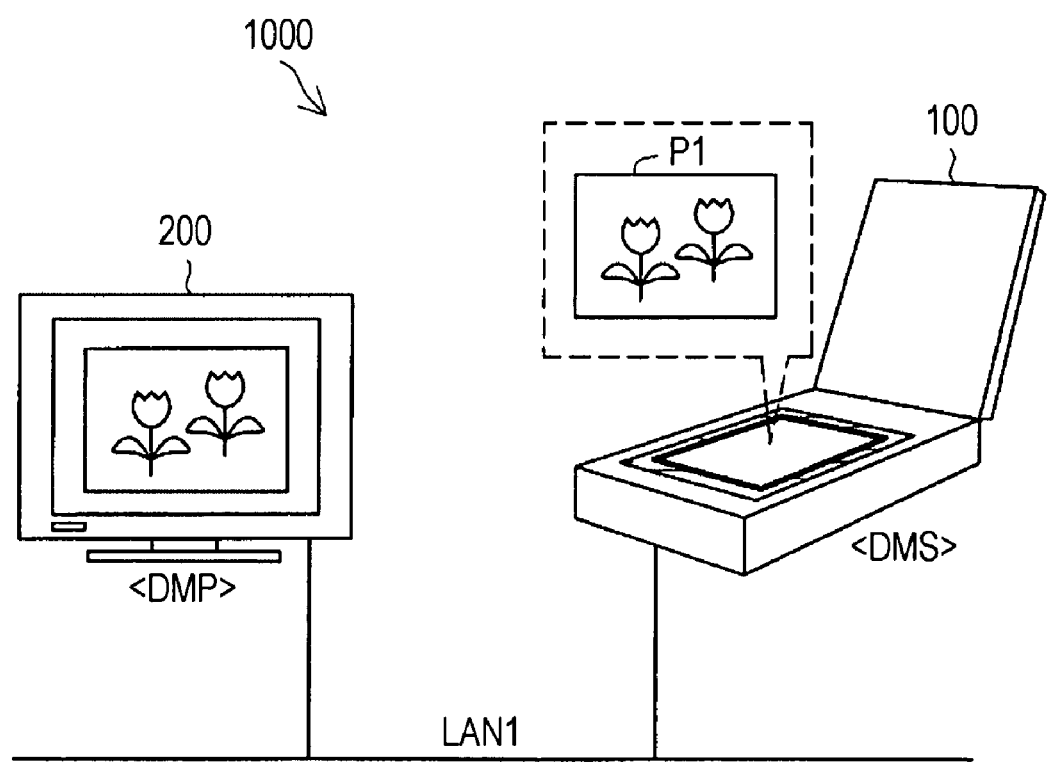
FIG. 1 is a view that illustrates the schematic configuration of an image display system according to the invention.

FIG. 1 is a view that illustrates the schematic configuration of an image display system according to the invention. This image display system 1000 includes a scanner device 100 and a DTV 200 and forms a DLNA system. These scanner device 100 and DTV 200 both are connected to a local area network LAN1. The scanner device 100 functions as a DMS (digital media server). The DTV 200 functions as a DMP (digital media player). Then, in the image display system 1000, it is configured so that a printed image P1 is read by the scanner device 100 and then displayed by the DTV 200.

Here, the phrase "the scanner device 100 functions as the DMS (digital media server)" does not mean that the scanner device 100 has a mass storage data storage device but it means that the scanner device 100 at least accepts a data request for DMS and then executes a data transmission process. Note that this point will be described later. The local area network LAN1 may be a wired network, such as IEEE 802.3, or may be a wireless network, such as IEEE 802.11b/g/a. Note that two or more of each DMS and DMP may be provided. In addition, the scanner device 100 may be a so-called multi-function device that has a built-in scanner unit.

Figure 2:
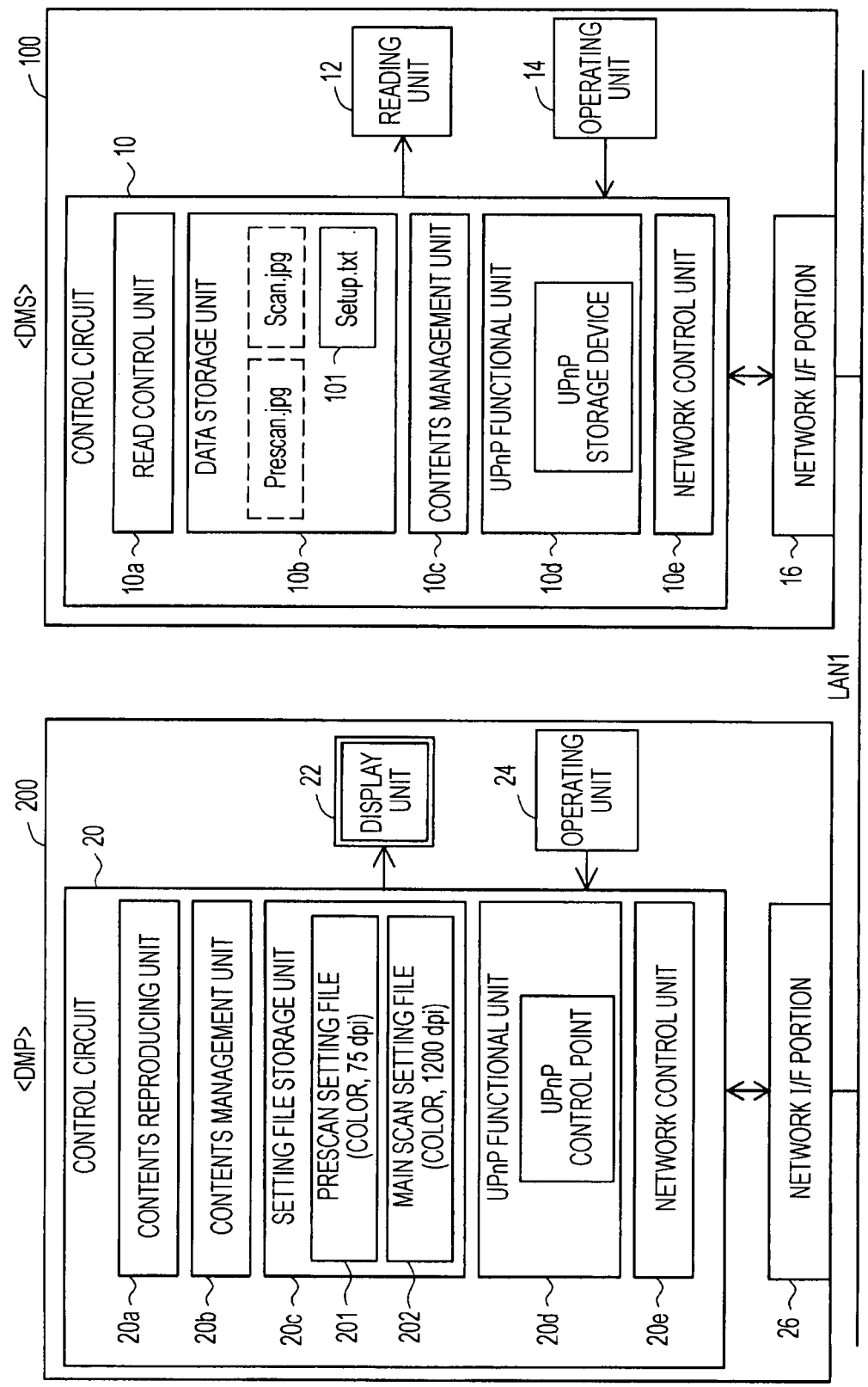
FIG. 2 is a block diagram that shows the configuration of a scanner device 100 and a DTV 200 shown in FIG. 1.

FIG. 2 is a block diagram that shows the configuration of the scanner device 100 and the DTV 200 shown in FIG. 1. This scanner device 100 includes a control circuit 10, a reading unit 12, an operating unit 14 and a network interface portion 16. The reading unit 12 is a mechanism that generates image data by scanning an image. The network interface portion 16 is formed of a group of interfaces for performing physical connection with the local area network LAN1 or establishing data link with a communication destination. The control circuit 10 is formed of a CPU (not shown), a memory, and the like, and includes a read control unit 10a, a data storage unit 10b, a contents management unit 10c, a UPnP functional unit 10d and a network control unit 10e.

The read control unit 10a controls the reading unit 12 and scans an image under a scan condition being set. The data storage unit 10b stores image data that are acquired by scanning and also stores a setting file 101 (file name: Setup.txt) in which the scan condition is described. In an initial state, only the setting file 101 is stored in the data storage unit 10b. Note that, as will be described later, this setting file 101 will be overwritten; however, a default scan condition is described in an initial state. The contents management unit 10c is a contents management mechanism that is in conformity with "UPnP AV standard V1.0" and manages information, such as URLs (Uniform Resource Locator) that indicate storage locations and file names, of digital contents that may be provided by the scanner device 100. The UPnP functional unit 10d executes communication operation in conformity with "UPnP device architecture V1.0". The network control unit 10e executes protocols of transport layer, such as TCP (Transmission Control Protocol) and UDP (User Datagram Protocol), and a protocol of network layer, such as IP (Internet Protocol), while controlling the network interface portion 16. Thus, communication is executed through the local area network LAN1.

Here, in UPnP, a UPnP compatible device (UPnP functional unit) operates as one of a "device", which is a device that offers various services and a "control point", which is a device that detects and controls other devices in a network. Then, the UPnP functional unit 10d in the scanner device 100 notifies the control point that it is a "UPnP storage device" that offers a storage service. Note that the above described data storage unit 10b corresponds to a setting file storage unit as set forth in the claims.

The DTV 200 includes a control circuit 20, a display unit 22, an operating unit 24 and a network interface portion 26. The display unit 22 is provided with a liquid crystal display and is able to display various menu screens in addition to contents, such as static images and dynamic images. The network interface portion 26 has the same function as the network interface portion 16 in the scanner device 100. The control circuit 20 is formed of a CPU (not shown), a memory, and the like, and includes a contents reproducing unit 20a, a contents management unit 20b, a setting file storage unit 20c, a UPnP functional unit 20d and a network control unit 20e.

The contents reproducing unit 20a has a static image or a dynamic image displayed on the liquid crystal display on the basis of a static image file or a dynamic image file. At this time, when the static image file is an image that is compressed in the format of JPEG (Joint Photographic Experts Group), the contents reproducing unit 20a executes expansion process and has the static image displayed on the liquid crystal display. The contents management unit 20b is a contents management mechanism that is in conformity with "UPnP AV standard V1.0" and manages various pieces of information related to contents acquired from the DMP (scanner device 100). The setting file storage unit 20c stores a setting file in which a scan condition in the scanner device 100 is described. The UPnP functional unit 20d executes communication operation in conformity with "UPnP device architecture V1.0". At this time, the UPnP functional unit 20d operates as a UPnP control point. The network control unit 20e has the same function as the network control unit 10e in scanner device 100.

Two setting files are stored in the setting file storage unit 20c in advance. The first setting file is a prescan setting file 201 in which a scan condition for performing prescan is described. The second setting file is a main scan setting file 202 in which a main scan condition for performing main scan is described. As the scan condition, type of image (color/monochrome) and reading resolution are specified. Then, the scan condition "color, 75 dpi" is described in the prescan setting file 201, and the scan condition "color, 1200 dpi" is described in the main scan setting file 202.

As described above, in the image display system 1000, the UPnP functional unit 10d in the scanner device 100 notifies that it is the UPnP storage device, and the UPnP functional unit 20d in the DTV 200 functions as the UPnP control point. This is because a method of transmitting/receiving image data between the storage device and the control point is established by the UPnP and, using this method of transmitting/receiving data, the read image is directly transmitted and received between the scanner device 100 and the DTV 200. Note that the invention is applicable to a future version of UPnP (DLNA). In addition, as long as a control point and a device are communicable in peer-to-peer fashion and the control point and the device have architectures that exchange messages, the invention is applicable to any network systems other than the UPnP (DLNA).

A2. Image Display Process

Figure 3:
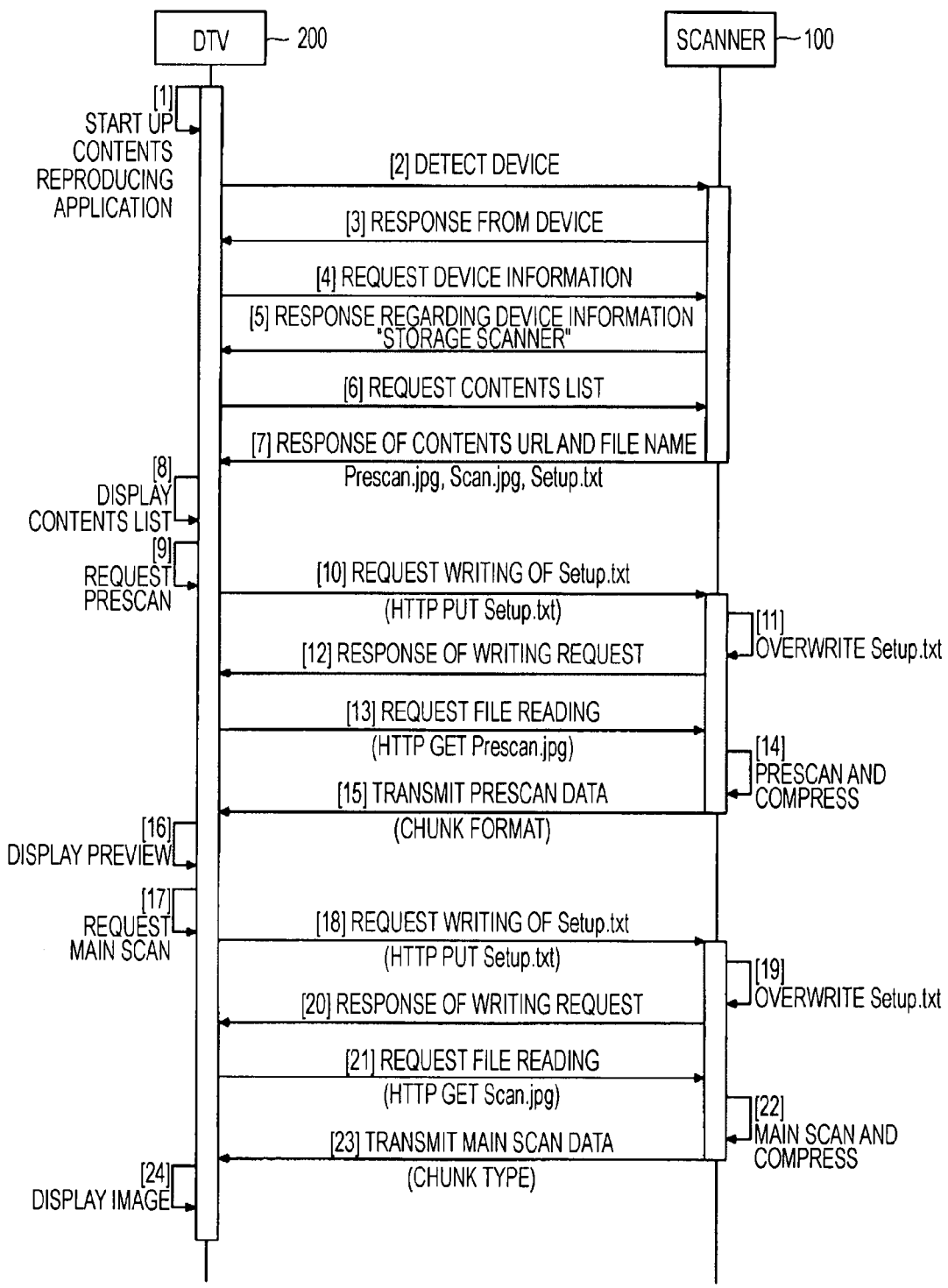
FIG. 3 is a sequence diagram that shows a typical example of an image display process in an image display system 1000.

FIG. 3 is a sequence diagram that shows a typical example of an image display process in the image display system 1000. When a user manipulates the operating unit 24 and selects a contents reproducing menu from an initial menu screen (not shown) displayed on the display unit 22 in the DTV 200, in step [1], the contents reproducing application starts up. In step [2], the UPnP functional unit 20d of the DTV 200 multicasts a discovery message to the local area network LAN1 to detect devices in the network. Then, in step [3], in the scanner device 100, the UPnP functional unit 10d responds to the discovery message. Note that the above device detection/response may also be realized in such a manner that, when the scanner device 100 joins a network, the UPnP functional unit 10d (device) of the scanner device 100 advertises that effect to the UPnP functional unit 20d (control point) of the DTV 200.

In step [4], the UPnP functional unit 20d of the DTV 200 transmits a message, which requests device information (description) related to the device and a service offered by the device, to the detected device (scanner device 100). In step [5], the UPnP functional unit 10d of the scanner device 100, as a response to this device information request, transmits the device information of the scanner device 100 to the DTV 200. Here, in this device information, "storage" is specified as a device type, and the character string "storage scanner" is contained in order to indicate that the scanner device 100 is a special scanner device that operates as a UPnP storage device.

In step [6], the contents management unit 20b of the DTV 200 requests the detected scanner device 100 (device) through the UPnP functional unit 20d so as to transmit an available contents list. In step [7], the contents management unit 10c of the scanner device 100 transmits the file names "Prescan.jpg", "Scan.jpg", and "Setup.txt" of three files stored in the data storage unit 10b and URLs of these three files to the DTV 200 through the UPnP functional unit 10d.

Here, the file name "Prescan.jpg" is a file name that is fixedly determined for image data acquired by performing prescan in the scanner device 100. In addition, the file name "Scan.jpg" is a file name that is fixedly determined for image data acquired by performing scan in the scanner device 100. In step [6], at the time when the contents list is requested, because prescan or main scan is not performed in the scanner device 100, there is no available contents (image files). However, after performing prescan or performing main scan, because a static image of "Prescan.jpg" or "Scan.jpg" becomes available, the file names "Prescan.jpg" and "Scan.jpg" that are fixedly determined as file names are transmitted to the DTV 200 in the scanner device 100. Note that, because "Setup.txt" is a file name of the setting file 101, it is not a file name of reproducible contents; however, it is transmitted together with the file names "Prescan.jpg" and "Scan.jpg".

Figure 4:
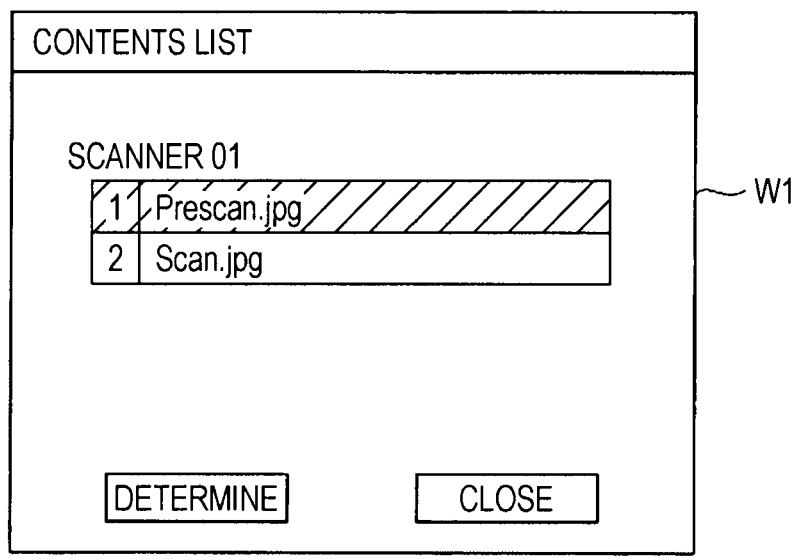
FIG. 4 is a view that illustrates the display screen of a contents list displayed on a display unit 22 in step [8].

In step [8], the contents management unit 20b of the DTV 200 instructs the contents reproducing unit 20a to display a contents list, and then the contents list that may be offered by the scanner device 100 is displayed on the display unit 22. FIG. 4 is a view that illustrates the display screen of a contents list displayed on the display unit 22 in step [8]. On this contents list display screen W1, the device name of the scanner device 100 "scanner 01" and the contents file names "Prescan.jpg" and "Scan.jpg" are displayed. Note that the reason why the file name "Setup.txt" is not displayed is as follows. In the DTV 200, the contents management unit 20b recognizes that the scanner device 100 is a special scanner device that functions as a storage device because the device information received in step [5] contains character string "storage scanner". In this case, the contents management unit 20b determines that the file name "Setup.txt" received in step [7] is not a file name of contents but a setting file in which a scan condition is described and stops the contents list display screen W1 from displaying it.

When a user places an image P1 on a reading face of the scanner device 100 as shown in FIG. 1, selects "Prescan.jpg" shown in FIG. 4 in the DTV 200 and then presses a determine button, instructions to read and display an image are given to the DTV 200. Thereafter, in step [9], a prescan request is issued to the UPnP functional unit 20d.

In step [10], the UPnP functional unit 20d of the DTV 200 reads out the prescan setting file 201 (see FIG. 2) from the setting file storage unit 20c and transmits a request message (HTTP PUT method) to the scanner device 100 so that this prescan setting file 201 is written as "Setup.txt". Because the URL of the setting file "Setup.txt" is notified in step [7], the UPnP functional unit 20d transmits a writing request with this URL and the file name specified. In step [11], the contents management unit 10c of the scanner device 100, when receiving the writing request of the setting file through the UPnP functional unit 10d, overwrites the setting file 101 stored in the data storage unit 10b. Thus, the scan condition "color, 75 dpi" is described in the setting file 101. Then, in step [12], the UPnP functional unit 10d of the scanner device 100 transmits a response, which indicates completion of writing of the setting file, to the DTV 200.

In step [13], the UPnP functional unit 20d of the DTV 200 transmits a reading request message of an image file of the file name "Prescan.jpg" (HTTP GET method) to the scanner device 100. Because the URL of the file of the file name "Prescan.jpg" is notified in step [7], the UPnP functional unit 20d transmits the reading request with this URL and the file name specified.

In step [14], the read control unit 10a of the scanner device 100, when receiving a file reading request through the UPnP functional unit 10d, refers to the setting file 101 (Setup.txt) and performs scan under the scan condition "color, 75 dpi" described in the setting file 101. Then, the read control unit 10a compresses the image acquired by scanning in the format of JPEG and stores it in the data storage unit 10b as a file of the file name "Prescan.jpg".

In step [15], the contents management unit 10c, when the compressed image data are initiated to be stored in the data storage unit 10b, encodes the compressed image data in chunk format and transmits them to the DTV 200 through the UPnP functional unit 10d. In the chunk format encoding, the compressed image data are transmitted as a chunk of arbitrary data size one after another. At this time, the data size of each chunk is contained in the header section and, in addition, for the last chunk, the header section contains that the chunk is the last chunk. Thus, in the receiving side DTV 200, even when the size of data to be received is not known in advance, it is possible to confirm that all the data have been received.

In step [16], the contents management unit 20b of the DTV 200 transfers the file of the file name "Prescan.jpg", which is received through the UPnP functional unit 20d, to the contents reproducing unit 20a, and the contents reproducing unit 20a expands the file and makes the display unit 22 display a preview image resulting from the prescan.

Figure 5:
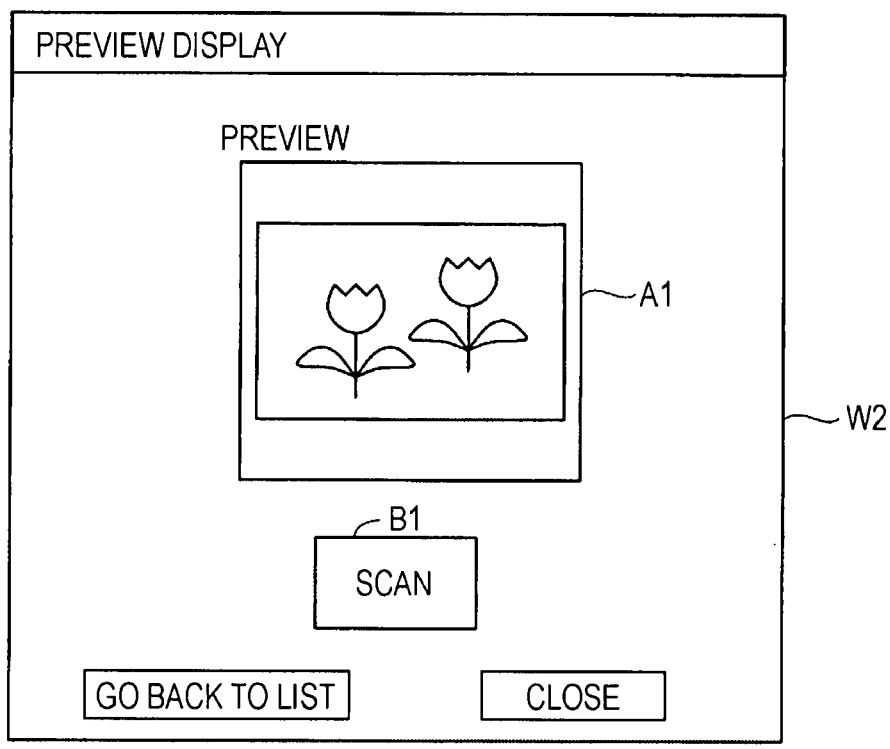
FIG. 5 is a view that illustrates a preview display screen displayed on the display unit 22 of the DTV 200 in step [16].

FIG. 5 is a view that illustrates a preview display screen displayed on the display unit 22 of the DTV 200 in step [16]. This preview display screen W2 includes a preview image display unit A1 and various buttons, such as a scan button B1. As a result of step [16], a preview image of the image P1 shown in FIG. 1 is displayed on the preview image display unit A1. Then, when a user sees this preview image and then presses the scan button B1 so as to display a scanned image on the display unit 22, in step [17], a scan request is issued to the UPnP functional unit 20d.

In step [18], the UPnP functional unit 20d of the DTV 200 reads out the main scan setting file 202 (see FIG. 2) from the setting file storage unit 20c and transmits a request message to the scanner device 100 so that this main scan setting file 202 is written as "Setup.txt". In step [19], the contents management unit 10c of the scanner device 100, as in the case of step [11], overwrites the setting file 101 stored in the data storage unit 10b. Thus, the scan condition "color, 1200 dpi" is described in the file "Setup.txt" instead of the scan condition "color, 75 dpi" that has been overwritten in the above step [11]. In step [20], the UPnP functional unit 10d of the scanner device 100 transmits a response of completion of writing of the setting file to the DTV 200.

In step [21], the UPnP functional unit 20d of the DTV 200 transmits a reading request message of an image file of the file name "Scan.jpg". In step [22], the read control unit 10a of the scanner device 100, when receiving the file reading request through the UPnP functional unit 10d, refers to the setting file 101 and performs scan under the scan condition "color, 1200 dpi" that is described in the setting file 101. Then, the read control unit 10a compresses the image acquired by scanning in the format of JPEG and stores it in the data storage unit 10b as a file of the file name "Scan.jpg". In step [23], the contents management unit 10c, as in the case of the above step [15], encodes the compressed image data in chunk format and transmits them to the DTV 200 through the UPnP functional unit 10d.

In step [24], the contents management unit 20b of the DTV 200 transfers the file of the file name "Scan.jpg", which is received through the UPnP functional unit 20d, to the contents reproducing unit 20a, and the contents reproducing unit 20a expands the file and makes the display unit 22 display an image resulting from the scan. In this manner, as shown in FIG. 1, the image P1 acquired by scanning is displayed by the DTV 200.

Note that, in the contents list display screen W1 shown in FIG. 4, when a user selects "Scan.jpg" instead of "Prescan.jpg", the above described steps [9] to [16] will not be executed but the steps [17] to [24] are executed, and an image acquired by scanning is displayed by the DTV 200.

As described above, in the image display system 1000, the scanner device 100 is configured to function as a storage device, and the file name of an image that is acquired by prescan and the file name of an image that is acquired by main scan are fixedly determined in advance. Then, the scanner device 100, when a reading request is given with these file names specified, performs a scan and transmits the acquired image file to the DTV 200. Thus, in the DTV 200, which is the DMP, as in the case where a file is read from a general storage device, it is possible to directly acquire a file of an image that is read by the scanner device 100, and it is possible to display the read image. In addition, in the scanner device 100, because a scan is performed by referring to a setting file of the file name determined in advance under the scan condition that is described in this setting file, in the DTV 200, as in the case where a file is written to a general storage device, it is possible to set a scan condition to the scanner device 100.

B. Second Embodiment

Figure 6:
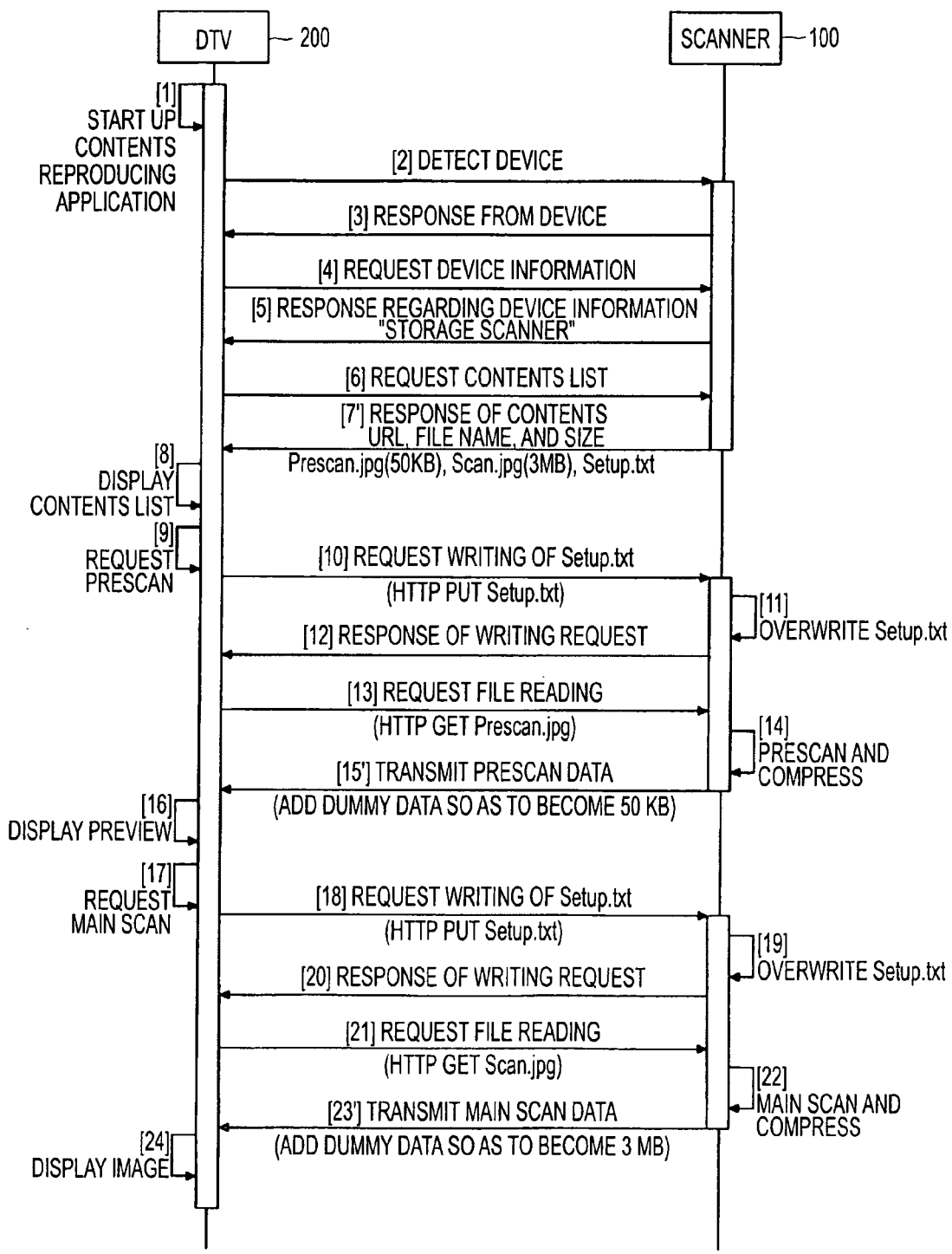
FIG. 6 is a sequence diagram that shows a typical example of an image display process according to a second embodiment.

FIG. 6 is a sequence diagram that shows a typical example of an image display process according to a second embodiment. The sequence of the second embodiment is obtained by changing the steps [7], [15] and [23] in the sequence shown in FIG. 3, and the other procedures are the same. In the first embodiment, data of an image acquired by prescan and main scan are encoded in chunk format and then transmitted but, in the present embodiment, they are transmitted without being encoded in chunk format. Note that the configuration of the image display system according to the second embodiment is the same as that of the image display system 1000 according to the first embodiment.

In step [7'], the contents management unit 10*c* of the scanner device 100 transmits the file names "Prescan.jpg", "Scan.jpg", and "Setup.txt" of three files and URLs of these three files to the DTV 200 and transmits the file sizes of "Prescan.jpg" and "Scan.jpg" to the DTV 200. Specifically, "50 KB" is transmitted as the file size of "Prescan.jpg" and "3 MB" is transmitted as the file size of "Scan.jpg".

As described above, the files "Prescan.jpg" and "Scan.jpg" are not generated without an actual scan. In addition, the sizes of these files vary among images to be scanned. Then, file sizes (the above 50 KB and 3 MB) are empirically determined in advance so that the file size of an acquired image is below those file sizes no matter what images are scanned, and the DTV 200 is notified of these file sizes in step [7']. Then, in step [15'], the contents management unit 10*c* of the scanner device 100 transmits the file of "Prescan.jpg" to the DTV 200 through the UPnP functional unit 10*d*. At this time, because the size of the file is equal to or less than 50 KB, dummy data are added so that the file size becomes 50 KB and the file is then transmitted. Similarly, in step [23'] as well, when the file of "Scan.jpg" is transmitted, dummy data are added so that the file size becomes 3 MB and the file is then transmitted.

In this manner, the DTV 200 is notified of a large enough file size in advance, and the file of an image acquired by scan is added with dummy data so as to become the notified file size and then transmitted. This is due to the following reason. That is, when data are transmitted from a storage, the size of a file to be transmitted initially needs to be notified. In addition, in the scanner device 100, when an image is scanned, image data that are acquired one by one from the read portion are sent while being compressed without waiting for completion of the scan. Therefore, when a small file size is initially notified, the size of the file actually transmitted may exceed the notified size, and the data received by the receiving side DTV 200 may possibly not processed appropriately.

Even with the above described configuration, as in the case of the first embodiment, the scanner device 100 is able to directly transmit a file of image data acquired by scan to the DTV 200, and the DTV 200 is able to display the image acquired by scan.

C. Third Embodiment

Figure 7:
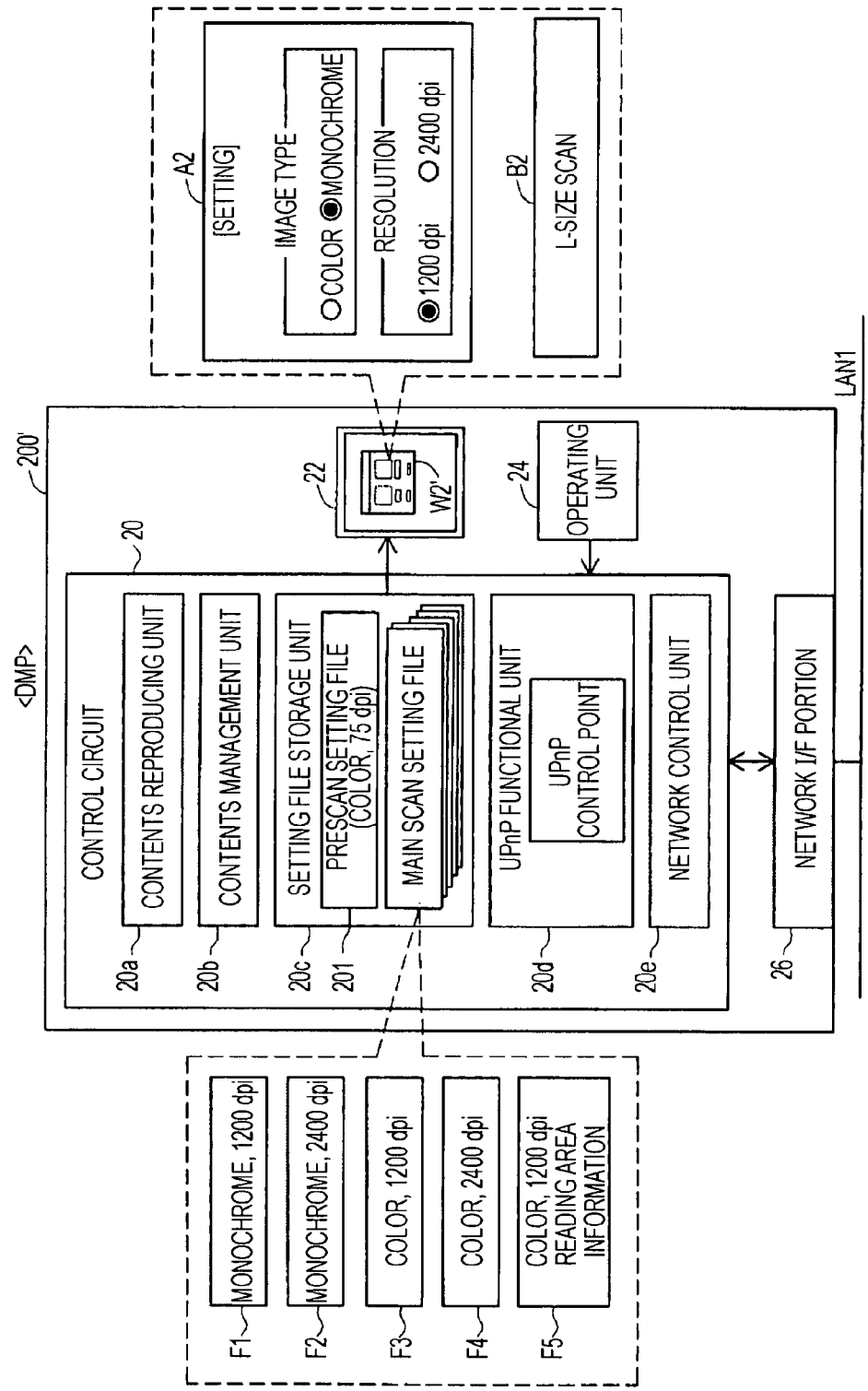
FIG. 7 is a block diagram that shows the configuration of a DTV according to a third embodiment.

FIG. 7 is a block diagram that shows the configuration of a DTV according to a third embodiment. This DTV 200' differs from the DTV 200 shown in FIG. 2 in that it includes a plurality of scan setting files F1 to F5 and a preview display screen W2' displayed on the display unit 22 has a setting section A2 and an L-size scan button B2 in addition to the preview display screen W2 shown in FIG. 5. Note that the configuration of the scanner device according to the third embodiment is the same as the configuration of the scanner device 100 shown in FIG. 2. In the above described first embodiment, when main scan is performed, the scan condition is fixed as "color, 1200 dpi", and a user is not allowed to change the condition. However, in the present embodiment, a user may change the scan condition of main scan.

Specifically, the setting section A2 displayed on the preview display screen W2' has radio buttons by which an image type (color/monochrome) and reading resolution (1200 dpi/2400 dpi) may be set. Then, a user manipulates the operating unit 24 and is able to set by changing these scan conditions. Here, the setting file storage unit 20*c* prepares the setting files F1 to F4 corresponding to patterns of scan conditions that may be set in the setting section A2. Then, the UPnP functional unit 20*d* of the DTV 200 transmits a request message such that a setting file corresponding to the scan condition that is set by a user in step [18] is read from the setting file storage unit 20*c* and is written as "Setup.txt". For example, as shown in FIG. 7, when it is set as "monochrome, 1200 dpi", the UPnP functional unit 20*d* transmits a request message such that the setting file F1 is written as "Setup.txt". With such a configuration, a user is allowed to set a scan condition under which main scan is performed.

In addition, when an L-size photograph is scanned, it is desired that an image acquired by scanning only the photograph portion thereof is displayed by the DTV 200. Then, in the present embodiment, the L-size scan button B2 is prepared on the preview display screen W2'. A user is able to make the DTV 200 display an image acquired by scanning only the L-size photograph portion by pressing this L-size scan button B2. A specific operation will be described as follows. When the L-size scan button B2 is pressed, the UPnP functional unit 20*d* of the DTV 200, in step [18], transmits a request message so as to write the setting file F5 as "Setup.txt". In this setting file F5, in addition to the image type (color) and reading resolution (1200 dpi), positional information regarding a reading area corresponding to the L-size photograph is described. Thus, the read control unit 10*a* of the scanner device 100, in step [22], is able to acquire an image file by scanning only the L-size photograph portion on the basis of the positional information.

Note that, when the file size of contents is notified in advance as in the case of the second embodiment, notification of the file size to the DTV 200 may be executed not in step [7] but in step [12] or in step [20] after transmission of the setting file. Because the file size to be notified in advance may be varied depending on the scan condition, with the above configuration, it is possible to notify a file size corresponding to the scan condition described in the setting file that is received in steps [10], [18]. Note that, in this case, in the scanner device 100, a table in which file sizes to be notified are in correspondence with patterns of assumed scan conditions may be prepared in advance.

D. Alternative Embodiments

Note that the components in the above embodiments, other than the components recited in the independent claims, are additive components and may be omitted appropriately. In addition, the invention is not limited to the above examples or embodiments, but it may be modified into various forms without departing from its scope. For example, the following alternative forms are applicable.

D1. Alternative Embodiment 1

In the above described embodiments, the image that is read by the scanner device 100 is the printed image P1. The invention is not limited to the printed image, but it may be configured to read an arbitrary image by the scanner device 100. For example, when the scanner device 100 is provided with a film adapter unit and is able to read a negative film and a positive film, it is possible to display images of these negative/positive films on the DTV 200 by scanning. In this manner, without developing a negative/positive film, it is possible to check the image with a large screen.

D2. Alternative Embodiment 2

In the above described embodiments, the image display system 1000 is the DLNA system based on the UPnP. However, in place of the DLNA system, the image display system 1000 may be configured to be a system that performs image transfer using PTP/IP (Picture Transfer Protocol/Internet Protocol). This PTP/IP is an image transfer protocol that is stipulated by CIPA (Camera & Imaging Products Association). With PTP/IP, it is possible to realize transmission of image data between two devices, that is, an initiator and a responder. The initiator and the responder may employ a digital still camera, a personal computer, and a printer. With such a configuration as well, the scanner device 100 functions as the responder and, when receiving a processing request with a predetermined file name specified, transmits an image file by performing scan. Thus, it is possible to display the read image on the DTV 200 which serves as the initiator.

D3. Alternative Embodiment 3

In the above described embodiments, the setting files 201, 202, F1 to F5 in which the scan conditions are described are stored in advance in the DTV 200. However, instead of storing in advance, a new setting file may be generated in accordance with an arbitrary scan condition that is set by a user. With this configuration, a user is allowed to freely set a scanning area on a preview image. In this case, it is only necessary to generate a new setting file by describing coordinate information regarding a scanning area as a scan condition in addition to the image type and the reading resolution.

D4. Alternative Embodiment 4

In the above described first embodiment, the prescan setting file 201 or the main scan setting file 202 is transmitted from the DTV 200 to the scanner device 100 thereby to overwrite the setting file 101 of the scanner device 100. However, the invention is not limited to it, but it may be a configuration in which a scan setting file is not transmitted. For example, in the scanner device 100, a prescan setting file and a main scan setting file may be stored in the data storage unit 10b in advance, and a corresponding setting file may be referred to in accordance with a scan method (prescan or main scan) to be performed.

D5. Alternative Embodiment 5

In the above described first embodiment, the DTV 200 specifies a file name and a URL in a file reading request that is transmitted to the scanner device 100 (step [13]). However, instead of this, it is applicable that only a file name is specified. With this configuration, in the scanner device 100, the URL of this file may be fixedly determined together with the file name "Scan.jpg", and, in the DTV 200, the file name and URL may be set in advance. Note that, similarly, in a writing request of Setup.txt (steps [10], [18]) as well, it is applicable that a file writing request is transmitted with only a file name specified. With the above configuration as well, it is possible to request the scanner device 100 to write a setting file and transmit image data acquired by scanning. In addition, it is possible to omit a process (step [6]) in which transmission of a contents list is requested of the scanner device 100.

D6. Alternative Embodiment 6

In the above described embodiments, portion of components implemented by hardware may be replaced by software. On the contrary, portion of components implemented by software may be replaced by hardware.

What is claimed is:

1. An image display system for reading and displaying an image comprising:

an image display device; and a scanner device that is connected to the image display device through a network, wherein the scanner device includes a setting file storage unit, wherein the image display device, when receiving instructions from a user to read and display an image mounted on the scanner device, transmits to the scanner device a scan setting file that describes a scan condition and transmits to the scanner device a writing request requesting the scanner device to write the scan setting file, wherein the scanner device, when receiving the writing request, writes the scan setting file in the setting file storage unit, wherein the image display device transmits a file reading request to the scanner device, the file reading request specifying a predetermined reserved file name, wherein the scanner device, when receiving the file reading request, reads the image under the scan condition described in the scan setting file and transmits to the image display device image data acquired by reading the image to make the image display device display the image data, the image data having the predetermined reserved file name, and wherein the scanner device notifies the image display device of a predetermined file size as a file size of the image data in advance, wherein the scanner device, when transmitting the image data and when the file size of the image data is below the predetermined file size, adds dummy data to the image data so as to become the predetermined file size, and image data, to which the dummy data are added, are then transmitted to the image display device.

2. An image display system for reading and displaying an image comprising:

an image display device; and a scanner device that is connected to the image display device through a network, wherein the scanner device includes a setting file storage unit, wherein the image display device, when receiving instructions from a user to read and display an image mounted on the scanner device, transmits to the scanner device a scan setting file that describes a scan condition and transmits to the scanner device a writing request requesting the scanner device to write the scan setting file, wherein the scanner device, when receiving the writing request, writes the scan setting file in the setting the storage unit, wherein the image display device transmits a file reading request to the scanner device, the file reading request specifying a predetermined reserved file name, wherein the scanner device, when receiving the file reading request, reads the image under the scan condition described in the scan setting file and transmits to the image display device image data acquired by reading the image to make the image display device display the image data, the image data having the predetermined reserved file name, and wherein the image display device functions as a control point in a network plug and play, and the scanner device is configured to notify the image display device that the scanner device functions as a storage device in the network plug and play in advance and also to notify the image display device of the reserved file name in advance.

* * * * *